(12) United States Patent
Fujimaki et al.

(10) Patent No.: US 9,043,261 B2
(45) Date of Patent: May 26, 2015

(54) LATENT VARIABLE MODEL ESTIMATION APPARATUS, AND METHOD

(75) Inventors: Ryohei Fujimaki, Minato-ku (JP); Satoshi Morinaga, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 234 days.

(21) Appl. No.: 13/614,997

(22) Filed: Sep. 13, 2012

(65) Prior Publication Data

US 2013/0325782 A1 Dec. 5, 2013

Related U.S. Application Data

(60) Provisional application No. 61/653,855, filed on May 31, 2012.

(51) Int. Cl.
*G06F 17/00* (2006.01)
*G06N 5/02* (2006.01)
*G06N 7/00* (2006.01)

(52) U.S. Cl.
CPC . *G06N 5/02* (2013.01); *G06N 7/005* (2013.01)

(58) Field of Classification Search
None
See application file for complete search history.

(56) References Cited

U.S. PATENT DOCUMENTS 8,037,043 B2 * 10/2011 Zoeter et al. ............ 707/705
2011/0229031 A1 * 9/2011 Ranganathan ............ 382/170

FOREIGN PATENT DOCUMENTS

| JP | 2009139769 | 6/2009 |
|---|---|---|
| JP | 2012042664 | 3/2012 |
| WO | 2012128207 A1 | 9/2012 |

OTHER PUBLICATIONS

Cseke, Botond, and Tom Heskes. "Approximate marginals in latent Gaussian models." The Journal of Machine Learning Research 12 (2011): 417-454, Feb. 1, 2011.*
Rue, Håvard, Sara Martino, and Nicolas Chopin. "Approximate Bayesian inference for latent Gaussian models by using integrated nested Laplace approximations." Journal of the royal statistical society: Series b (statistical methodology) 71.2 (2009): 319-392.*
International Search Report dated Jul. 9, 2013 from the International Searching Authority in corresponding application No. PCT/JP2013/002900.
Naonori Ueda, "New development of the EM Algorithm; Variational Bayes", IEICE technical report, dated Jan. 29, 2002, vol. 101, No. 616, 9 pages total.

(Continued)

*Primary Examiner* — Jeffrey A Gaffin
*Assistant Examiner* — David H Kim
(74) *Attorney, Agent, or Firm* — Sughrue Mion, PLLC (57) ABSTRACT

To provide a latent variable model estimation apparatus capable of implementing the model selection at high speed even if the number of model candidates increases exponentially as the latent state number and the kind of the observation probability increase. A variational probability calculating unit 71 calculates a variational probability by maximizing a reference value that is defined as a lower bound of an approximation amount, in which Laplace approximation of a marginalized log likelihood function is performed with respect to an estimator for a complete variable. A model estimation unit 72 estimates an optimum latent variable model by estimating the kind and a parameter of the observation probability with respect to each latent state. A convergence determination unit 73 determines whether a reference value, which is used by the variational probability calculating unit 71 to calculate the variational probability, converges.

9 Claims, 6 Drawing Sheets

(56) References Cited

OTHER PUBLICATIONS

Naonori Ueda, "Variational Bayesian Learning for Optimal Model Search", Transactions of the JSAI, dated Nov. 1, 2001, vol. 16, pp. 299-308.

M.J. Beal, Variational Bayesian Hidden Markov Models, Variational Algorithms for Approximate Bayesian Interface. Chapter 3, PhD thesis, p. 82-105, University College London, 2003.

C. Bishop, Hidden Markov Models, Pattern Recognition and Machine Learning, Springer, 2007, p. 610-629.

Ryohei Fujimaki, Factorized Asymptotic Bayesian Inference for Mixture Modeling, Proceedings of the 15th International Conference on Artificial Intelligence and Statistics (AISTATS) 2012, p. 400-408.

Jurgen Van Gael, et al., Bean Sampling for the Infinite Hidden Markov Model, Proceedings of the 25th International Conference on Machine Learning.

* cited by examiner

LATENT VARIABLE MODEL ESTIMATION APPARATUS, AND METHOD

BACKGROUND OF THE INVENTION

1. Field of the Invention

The present invention relates to latent variable model estimation apparatus and method for multivariate data having sequential dependence, and a computer-readable recording medium in which a latent variable model estimation program is recorded, particularly to latent variable model estimation apparatus and method for approximating a model posterior probability to maximize a lower bound of the model posterior probability, thereby estimating a latent variable model of multivariate data having sequential dependence, and a computer-readable recording medium in which a latent variable model estimation program is recorded.

2. Description of the Related Art

There are various pieces of data having sequential dependence. Examples of the data having the sequential dependence include data having temporal dependence, a text depending on a character sequence, and genetic data depending on a base sequence.

Pieces of data typified by sensor data acquired from an automobile, a laboratory data history of a medical checkup, and an electric demand history are multivariate data having the "sequential dependence (in the example, temporal dependence)". An analysis of the data is applied to many industrially important fields. For example, it is conceivable that a breakdown cause of the automobile is analyzed to implement a quick repair by analyzing sensor data acquired from the automobile. It is also conceivable that an estimation of a risk of a disease and prevention of the disease can be implemented by analyzing the laboratory data history of the medical checkup. It is also conceivable that the electric demand is predicted to prepare for excess or deficiency by analyzing the electric demand history.

Generally such pieces of data are modeled using a latent variable model (for example, hidden Markov model) having the sequential dependence. For example, in order to use the hidden Markov model, it is necessary to decide a latent state number, a kind of an observation probability distribution, and a distribution parameter. In the case that the latent state number and the kind of the observation probability distribution are found, the parameter can be estimated using an expectation maximization method (for example, see Non Patent Literature (NPTL) 1).

A problem that the latent state number or the kind of the observation probability is found is generally called a "model selection problem" or a "system identification problem", and is an important problem to construct a reliable model. Therefore, various technologies are proposed.

For example, NPTL 2 proposes a method for maximizing variational free energy by a variational Bayesian method, as a method for deciding the latent state number. For example, NPTL 3 proposed a non-parametric Bayesian method, in which a hierarchical Dirichlet process prior distribution is used, as the method for deciding the latent state number.

In NTPL 4, a complete marginal likelihood function is approximated to a mixed model that is of a representative example of a latent variable model independently of the temporal dependence, and its lower bound is maximized.

CITATION LIST

Non Patent Literatures

NPTL 1: C. Bishop, Pattern Recognition and Machine Learning, Springer, 2007, pp. 610-629

NPTL 2: Beal, M. J. Variational Algorithms for Approximate Bayesian Inference. Chapter 3, PhD thesis, University College London, 2003

NPTL 3: van Gael, J., Saatci, Y, Teh, Y.-W., and Ghahramani, Z. Beam sampling for the infinite hidden Markov model. In ICML, 2008

NPTL4: RyoheiFujimaki, SatoshiMorinaga: Factorized Asymptotic Bayesian Inference for Mixture Modeling. Proceedings of the fifteenth international conference on Artificial Intelligence and Statistics (AISTATS), 2012

SUMMARY OF THE INVENTION

In the method disclosed in NPTL 2, unfortunately approximation accuracy of a marginalized likelihood degrades because it is assumed that the latent state and distribution parameter are independent on a variational distribution when the lower bound of the marginalized likelihood function is maximized.

In the method disclosed in NPTL 3, although an optimization algorithm based on a Monte Carlo method is well known, unfortunately a calculation amount becomes extremely large.

Because of the extremely large calculation amount, it is virtually difficult to decide the kind of the observation probability by the methods disclosed in NPTL 2 and NPTL 3.

The problem with the calculation amount will be described by taking the case that the observation probability distribution is a mixed polynomial curve as an example. The latent state is omitted because the latent state has no influence on the following discussion. In the case that an observation of a certain latent state is a polynomial curve, it is necessary to correctly select an order of the curve, such as a first-order curve (straight line), a second-order curve, and a third-order curve. In the above methods, it is necessary to calculate an information amount criterion with respect to all model candidates, such as the case including three latent state numbers, two straight lines, and two second-order curves and the case including five latent state numbers, three third-order curves, and two fourth-order curves. Assuming that the latent state number is 10 and the maximum order of the curve is 10, there are hundreds of thousands of model candidates. Assuming that the latent state number is 20 and the maximum order of the curve is 20, there are tens of billions of model candidates. The number of model candidates increases exponentially with increasing complexity of the model to be searched. Accordingly, it is virtually difficult to perform the calculation by the methods disclosed in NPTL 2 and NPTL 3.

The technology disclosed in NPTL 4 cannot be applied to the latent variable model having the sequential dependence because the independence is required between the latent variables. In the technology disclosed in NPTL 4, because the sequential dependence between the latent variables is not considered, the variational distribution of the latent variable is calculated as an equation (15) of NPTL 4. However, the equation is not suitable in the case that the sequential dependence exists between the latent variables, and there is no guarantee that the proper model is obtained. Additionally, unfortunately a transition probability between the latent variables cannot be calculated.

Therefore, an object of the invention is to implement the model selection at high speed even if the number of model candidates increases exponentially as the latent state number and the kind of the observation probability increase in a learning problem of the latent variable model having the sequential dependence with respect to the multivariate data.

In accordance with a first aspect of the invention, a latent variable model estimation apparatus includes: a variational probability calculating unit that calculates a variational probability by maximizing a reference value, the reference value being defined as a lower bound of an approximation amount in which Laplace approximation of a marginalized log likelihood function is performed with respect to an estimator for a complete variable; a model estimation unit that estimates an optimum latent variable model by estimating a kind and a parameter of an observation probability in each latent state; and a convergence determination unit that determines whether a reference value, which is used to calculate the variational probability by the variational probability calculating unit, converges.

In accordance with a second aspect of the invention, a latent variable model estimation method includes: calculating a variational probability by maximizing a reference value, the reference value being defined as a lower bound of an approximation amount in which Laplace approximation of a marginalized log likelihood function is performed with respect to an estimator for a complete variable; estimating an optimum latent variable model by estimating a kind and a parameter of an observation probability in each latent state; and determining whether a reference value, which is used to calculate the variational probability, converges.

In accordance with a third aspect of the invention, a computer-readable recording medium in which a latent variable model estimation program is recorded, the latent variable model estimation program causing a computer to execute: a variational probability calculation processing of calculating a variational probability by maximizing a reference value, the reference value being defined as a lower bound of an approximation amount in which Laplace approximation of a marginalized log likelihood function is performed with respect to an estimator for a complete variable; a model estimation processing of estimating an optimum latent variable model by estimating a kind and a parameter of an observation probability in each latent state; and a convergence determination processing of determining whether a reference value, which is used to calculate the variational probability in the variational probability calculation processing, converges.

According to the invention, the model can be selected at high speed even if the number of model candidates increases exponentially as the numbers of latent states and kinds of the observation probability increase.

DETAILED DESCRIPTION OF EMBODIMENTS

Hereinafter, an exemplary embodiment of the invention will be described with reference to the drawings. In the following description, for the sake of convenience, sometimes a notation in a mathematical formula differs from a notation in a sentence. For example, a symbol "~" is described above the variable in the mathematical formula, while the symbol "~" is described on the right side in the sentence for the sake of convenience. The difference between the notation in the mathematical formula and the notation in the sentence falls within a range where those skilled in the art can understand the difference.

A latent variable model estimation apparatus of the invention estimates a latent variable model having sequential dependence. In the following description, the data having the temporal dependence is taken as an example of the data having the sequential dependence. However, the invention is not limited to the data having the temporal dependence, but the invention can be applied to any piece of data having the sequential dependence. For example, the invention may be applied to data depending on a character sequence, data depending on a base sequence, and data depending on another sequence.

A hidden Markov model (see an equation (1)) that is of a representative model of the latent variable model having the sequential dependence will specifically be described below.

[Formula 1]

$$p(x^N, z^N \mid M) = \int \prod_{n=1}^{N} \left\{ p(z_n^1 \mid \alpha) \prod_{k=1}^{K} \prod_{t=2}^{T_n} p_k(z_n^t \mid \beta_k)^{z_{nk}^{t-1}} \times \prod_{k=1}^{K} \prod_{t=1}^{T_n} p(x_n^t \mid \phi_k)^{z_{nk}^t} \right\} p(\theta \mid M) d\theta, \quad \text{equation (1)}$$

It is assumed that a data string $x^n$ (n=1, . . . , N) depending on time is input. At this point, it is assumed that each $x^n$ is a multivariate data string ($x^n=x^n1, \ldots, x^nT, t=1, \ldots, N$) having a length Tn. Then a latent variable $z^n t=(z^n t1, \ldots, z^n tK)$ is defined with respect to an observation variable $x^n t$. $z^n tk=1$ means that $x^n t$ is data generated from a kth latent state, and $z^n tk=0$ means otherwise. $\Sigma_{k=1}^{K} z^n tk=1$ holds. A set of x and z is called a "complete variable". x is called an incomplete variable as its contrast. A simultaneous distribution of the hidden Markov model related to the complete variable is defined as P(x,z) in the equation (1). A variational distribution of the hidden Markov model related to the latent variable is expressed by a distribution $q(z^n tk)$ in the kth latent state $z^n tk$ at a time t and a distribution $q(z^n t-1k, z^n tj)$ that transitions from a kth state to a jth state at a time t−1 to the time t.

In the equation (1), K indicates a latent state number. $\theta=(\alpha 1, \ldots, \alpha K, \beta 1, \ldots, \beta K, \phi 1, \ldots, \phi K)$ indicates a model parameter. Where $\alpha k$ indicates an initial probability in the kth latent state, $\beta k$ indicates a transition probability from the kth latent state, and $\phi k$ indicates an observation parameter with respect to the kth latent state. S1, . . . , SK indicate kinds of the observation probabilities corresponding to $\phi k$. For example, candidates that may be S1 to SK are {normal distribution, log-normal distribution, exponential distribution} in the case of a multivariate data generation probability, and the candidates are {zero-order curve, first-order curve, second-order curve, third-order curve} in the case of a multinomial curved output.

Although a specific example is always described using the hidden Markov model, the invention can also be applied to similar models of extended models (such as a hidden semi-Markov model and a factorized hidden Markov model) of the hidden Markov model. Similarly, although the distribution of a target variable X is described in this specification, the invention can also be applied to the case, such as regression and discriminant, in which an observation distribution is a conditional model P (Y|X) (Y is a random variable that is of the target).

First Exemplary Embodiment

Figure 1:
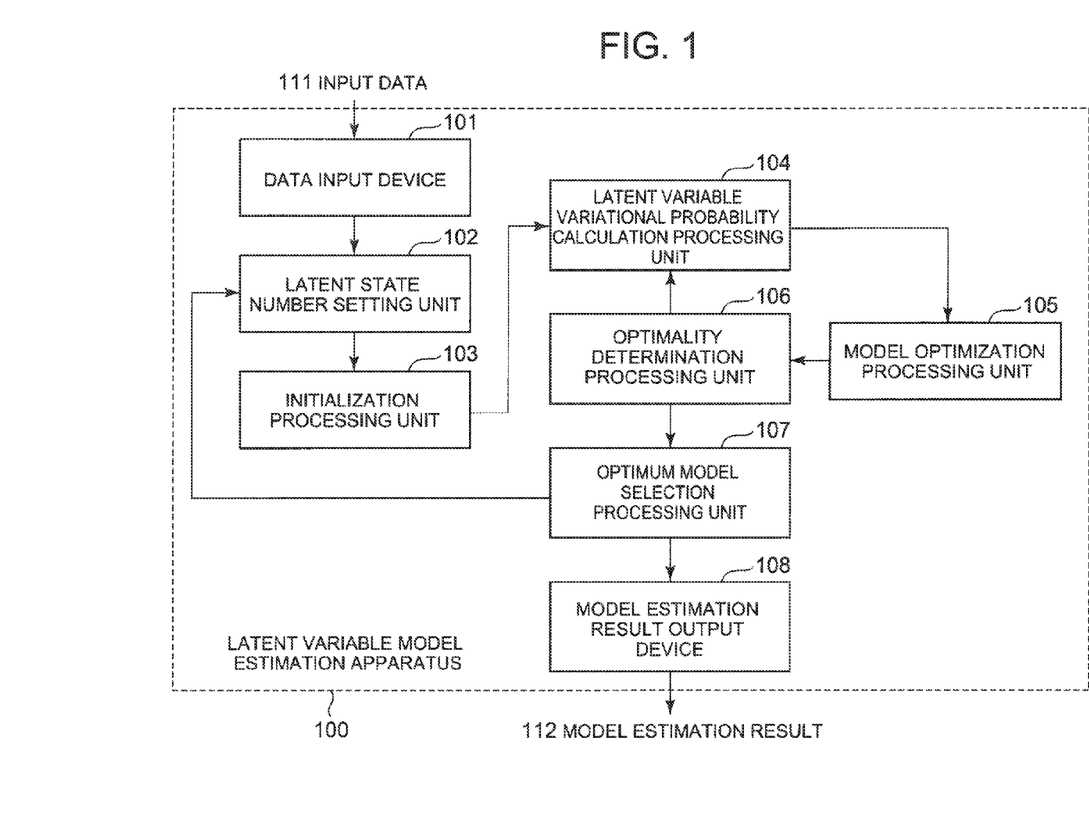
FIG. 1 is a block diagram illustrating a latent variable model estimation apparatus according to a first exemplary embodiment of the invention.

FIG. 1 is a block diagram illustrating a latent variable model estimation apparatus according to a first exemplary embodiment of the invention. A latent variable model estimation apparatus 100 includes a data input device 101, a latent state number setting unit 102, an initialization processing unit 103, a latent variable variational probability calculation processing unit 104, a model optimization processing unit 105, an optimality determination processing unit 106, an optimum model selection processing unit 107 and a model selection result output device 108. Input data 111 is input to the latent variable model estimation apparatus 100, and the latent state number and the kind of the observation probability are optimized with respect to the input data 111 and output as a model estimation result 112.

Figure 2:
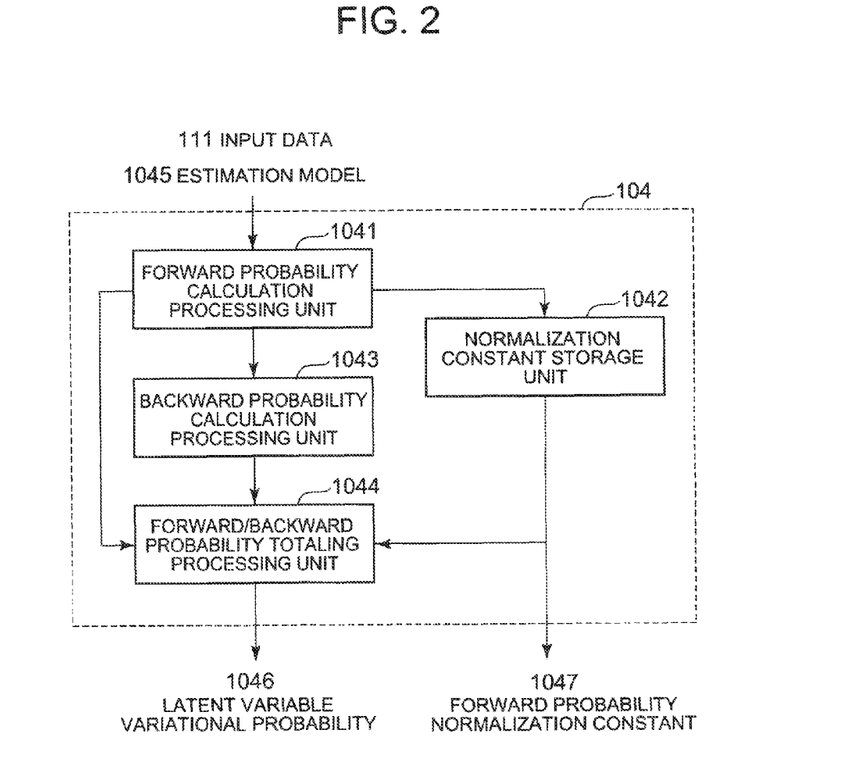
FIG. 2 is a block diagram illustrating an example of a latent variable variational probability calculation processing unit 104.

FIG. 2 is a block diagram illustrating an example of the latent variable variational probability calculation processing unit 104. The latent variable variational probability calculation processing unit 104 includes a forward probability calculation processing unit 1041, a normalization constant storage unit 1042, a backward probability calculation processing unit 1043, and a forward/backward probability totaling processing unit 1044. The input data 111 and an estimation model 1045 estimated by the model optimization processing unit 105 are input to the latent variable variational probability calculation processing unit 104, and the latent variable variational probability calculation processing unit 104 outputs a latent variable variational probability 1046 and a forward probability normalization constant 1047.

The input device 101 is an input interface device to which the input data 111 is input. Parameters, such as the kind of the observation probability and a candidate value of the latent state number, which are necessary to estimate the model, are also simultaneously input to the input device 101 in inputting the input data 111.

The latent state number setting unit 102 selects the latent state number of the model from the input candidate values of the latent state numbers, and sets the latent state number. Hereinafter K indicates the set latent state number.

The initialization processing unit 103 performs initialization processing for the purpose of estimation. The initialization can be performed by any method. Examples of the initialization includes a method for randomly setting the kind of the observation probability in each latent state and randomly setting the parameter of each observation probability according to the set kind and a method for randomly setting a latent variable variational probability.

The latent variable variational probability calculation processing unit 104 calculates the latent variable variational probability. At this point, because the parameter θ is calculated by the initialization processing unit 103 or the model optimization processing unit 106, the latent variable variational probability calculation processing unit 104 uses the calculated value of the parameter θ. The latent variable variational probability calculation processing unit 104 calculates the variational probability by maximizing the following optimization reference A. The optimization reference A is defined as a lower bound of an approximation amount in which Laplace approximation of a marginalized log likelihood function is performed with respect to an estimator (for example, a maximum likelihood estimator or a maximum a posteriori estimator) for the complete variable. The lower bound can be derived using optimality of the estimator with respect to the complete variable and concavity of a logarithmic function.

The procedure will be described by taking a hidden Markov model as an example. First the lower bound of the marginalized log likelihood function is discussed. The lower bound is expressed by the following equation (2).

[Formula 2]

$$\log p(x^N \mid M) \geq \sum_{z^N} q(z^N) \log\left(\frac{p(x^N, z^N \mid M)}{q(z^N)}\right) \quad \text{equation (2)}$$

In the equation (2), an equal sign holds by maximizing a variational probability q(zN). The following equation (3) is obtained as an approximation equation of the marginalized log likelihood function such that the Laplace approximation is performed to a marginalized likelihood of the complete variable of a numerator using the maximum likelihood estimator for the complete variable.

[Formula 3]

$$\mathcal{J}(q, \bar{\theta}, x^N) = \sum_{z^N} q(z^N) \Bigg( \log p(x^N, z^N \mid \bar{\theta}) - \frac{\mathcal{D}_\alpha}{2} \log N - \sum_{k=1}^K \frac{\mathcal{D}_{\beta_k}}{2} \log\left(\sum_{n,t=1}^{N,T_n-1} z_{nk}^t\right) - \sum_{k=1}^K \frac{\mathcal{D}_{\phi_k}}{2} \log\left(\sum_{n,t=1}^{N,T_n} z_{nk}^t\right) - \log q(z^N) \Bigg). \quad \text{equation (3)}$$

Where a superscript bar indicates the maximum likelihood estimator for the complete variable. D* indicates a dimension of a subscript parameter *

The lower bound of the equation (3) is calculated by an equation (4) using a property in which the maximum likelihood estimator maximizes the log likelihood function with respect to the equation (3) and the fact that logarithmic function is a concave function.

[Formula 4]

$$\mathcal{G}(q, \tilde{q}, x^N, \theta) = \sum_{n=1}^{N} \sum_{z_n} q(z_n) \left[ \log p(x_n, z_n \mid \theta) + \sum_{k,t=1}^{K,T_n} z_{nk}^t \log \delta_k^t - \log q(z^N) \right] + \sum_{n,t=1}^{N,T_n} \log \Delta^t - \frac{\mathcal{D}_\alpha}{2} \log N - \sum_{k=1}^K \left\{ \frac{\mathcal{D}_{\beta_k}}{2} \times \left( \log\left(\sum_{n,t=0}^{N,T_n-1} \tilde{q}(z_{nk}^t)\right) - 1 \right) + \frac{\mathcal{D}_{\phi_k}}{2} \left( \log\left(\sum_{n,t}^{N,T_n} \tilde{q}(z_{nk}^t)\right) - 1 \right) \right\},$$

$$\delta_k^t = \begin{cases} \frac{1}{\Delta^t} \exp\left(-\frac{\mathcal{D}_{\beta_k}}{2\left(\sum_{n,t=1}^{N,T_n-1} \tilde{q}(z_{nk}^t)\right)} - \frac{\mathcal{D}_{\phi_k}}{2\left(\sum_{n,t=1}^{N,T_n} \tilde{q}(z_{nk}^t)\right)}\right) & \text{if } t < T_n \\ \frac{1}{\Delta^t} \exp\left(-\frac{\mathcal{D}_{\phi_k}}{2\left(\sum_{n,t=1}^{N,T_n} \tilde{q}(z_{nk}^t)\right)}\right) & \text{if } t = T_n \end{cases} \quad \text{equation (4)}$$

Variational distributions q(z″tk) and q(z″t−1k, z″tj) of the latent variable are calculated by maximizing the equation (4) with respect to q. However, $q^{(t)}$ is fixed to $q\sim=q^{(t-1)}$ and θ=θ$^{(i-1)}$ when a superscript (i) indicates an (i)th repetition in a repetitive calculation of the latent variable variational probability calculation processing unit 104, the model optimization processing unit 105, and the optimality determination processing unit 106.

B is a portion to which an underline is added in the equation (4). B can be referred to by an equation (8) described later.

The elements included in the latent variable variational probability calculation processing unit 104 will be described with reference to FIG. 2. The input data 111 and the estimation model are input to the forward probability calculation processing unit 1041. The forward probability calculation processing unit 1041 calculates the probability of z"t as a forward probability in the case that observations (x"1, . . . , x"t) are obtained from a time 1 to the time t. At this point, the forward probability is calculated in consideration of model complexity (for example, a term related to δtk in the equation (4)), which is calculated using the optimization reference A. The forward probability calculation processing unit 1041 stores a normalization constant, which sets a sum of latent states of the probability of z"t to 1, in the normalization constant storage unit 1042.

Similarly, the backward probability calculation processing unit 1043 calculates the probability of x"t as a backward probability in the case that observations (x"t+1, . . . , x"T) are obtained from a time t+1 to a time T. The normalization constant, which is obtained at the same time as the calculation of the forward probability, is read from the normalization constant storage unit 1042 in calculating the backward probability. At this point, the backward probability is calculated in consideration of the model complexity (for example, the term related to δtk in the equation (4)), which is calculated using the optimization reference A.

Finally the forward/backward probability totaling processing unit 1044 calculates the variational distribution from the forward probability and the backward probability. For example, the forward/backward probability totaling processing unit 1044 calculates q(z"tk) as the probability of z"tk in obtaining x"1, . . . , x"T. The forward/backward probability totaling processing unit 1044 calculates q(z"tk) as a product of the forward probability and the backward probability using the following equation (5).

[Formula 5]

$$q^{(i)}(z_{nk}^t) = f_{nk}^{t(i)} b_{nk}^{t(i)} \quad \text{equation (5)}$$

The forward/backward probability totaling processing unit 1044 calculates q(z"t−1j, z"tk) as a product of a probability of z"t−1j in the case that x"1, . . . , x"t−1 are obtained, a probability of transition from the latent state j to the latent state k, a probability of observing xnt in the latent state k, and a probability of x"t in the case that (x"t+1, x"T) are obtained. Specifically, the forward/backward probability totaling processing unit 1044 calculates q(z"t−1j, z"tk) using the following equation (6) (see an equation (7) for a definition of q~ of the left side of the equation (6)).

[Formula 6]

$$q^{(i)}(z_{nj}^{t-1}, z_{nk}^t) = \frac{1}{\zeta_n^{t(i)}} f_{nj}^{t-1(i)} \tilde{p}(x_n^t | \phi_k^{(i-1)}) \beta_{jk}^{(i-1)} b_{nk}^{t(i)} \quad \text{equation (6)}$$

The procedure will be described by taking the hidden Markov model as an example. The forward probability and the backward probability are calculated using the following equation (7).

[Formula 7]

$$f_{nk}^{t(i)} = \begin{cases} \dfrac{1}{\zeta_n^{1(i)}} \alpha_k^{(i-1)} \tilde{p}(x_n^1 | \phi_k^{(i-1)}) & \text{if } t = 1 \\ \dfrac{1}{\zeta_n^{t(i)}} \tilde{p}(x_n^t | \phi_k^{(i-1)}) \sum_{j=1}^{K} f_{nj}^{t-1(i)} \beta_{jk}^{(i-1)} \end{cases}$$

$$b_{nk}^{t(i)} = \begin{cases} \dfrac{1}{\zeta_n^{t+1(i)}} \sum_{j=1}^{K} b_n^{t+1(i)} \tilde{p}(x_n^{t+1} | \phi_j^{(i-1)}) \beta_{kj}^{(i-1)} \\ 1 \quad \text{if } t = T_n \end{cases}$$

$$\tilde{p}(x_n^t | \phi_k^{(i-1)}) = p(x_n^t | \phi_k^{(i-1)}) \delta_k^{t(i-1)}.$$

equation (7)

Where f$^t$nk (a first equation of the equation (7)) expresses forward probability, and b$^t$nk (a second equation of the equation (7)) expresses the backward probability. More specifically, both the forward probability and the backward probability are described as recurrence equation in the equation (7). The forward probability can sequentially be calculated from t=1, and the backward probability can sequentially be calculated from t=T. The normalization constant is calculated by ζ$^t$n. The backward probability calculation processing unit 103 may calculate the backward probability using the normalization constant, which is calculated by the forward probability calculation processing unit 1041 to calculate the forward probability.

A third equation of the equation (5) includes multiplication related to δ. This means that the model complexity calculated using the optimization reference A is considered.

The model optimization processing unit 105 optimizes the model (parameter θ and its kind S) with respect to the equation (4). Specifically, the model maximizing G in the equation (4) is calculated while q and q~ are fixed to the variational distribution (q$^{(i)}$) of the latent variable, which is calculated by the latent variable variational probability calculation processing unit 104. An important point of the processing is that, in G defined by the equation (4), because an optimization function can be resolved in each component, S1 to SK and the parameters φ$_1$ to φ$_K$ can separately be optimized without considering a combination (which one of S1 to SK is assigned) of the kinds of components. Therefore, in optimizing the kind of the component, the optimization can be performed while a combinatorial explosion is avoided.

The optimality determination processing unit 106 determines whether the optimization reference A calculated using the equation (4) converges. When the optimization reference A does not converge, the pieces of processing from the latent variable variational probability calculation processing unit 104 to the optimality determination processing unit 106 are repeated. In calculating the optimization reference A calculated using the equation (4), the calculation of Σzn q(zn) log q(zn) requires a calculation amount of an exponential time because the latent state is not independent. However, the calculation can efficiently be performed using the normalization constant stored in the normalization constant storage unit 1042. For example, the hidden Markov model is calculated using the following equation (8).

[Formula 8]

$$\sum_{n=1}^{N} \sum_{t=1}^{T_n} \log \xi_n^{A(i)} + B \qquad \text{equation (8)}$$

B indicated in the equation (8) is the portion to which the underline is added in the equation (4).

The pieces of processing from the latent variable variational probability calculation processing unit 104 to the optimality determination processing unit 106 are repeated to update the variational distribution and the model, which allows the proper model to be selected. The monotonous increase of the optimization reference A is guaranteed by the repetition.

When the optimization reference A converges, the model corresponding to larger one of the optimization reference A, which is calculated by the loop processing from the latent variable variational probability calculation processing unit 104 to the optimality determination processing unit 106, and the optimization reference A, which is calculated by the preceding loop processing, is set to the optimum model with respect to the latent state number K set by the latent state number setting unit 102. When the model optimization is completed for all the candidate values, the processing transfers to the model estimation result output device 108. When the candidate to which the optimization is not performed yet exists, the processing transitions to the latent state number setting unit 102.

The model estimation result output device 108 outputs the optimum latent state number, the kind, the parameter, and the variational distribution of the observation probability as the model estimation result output 112.

For example, the latent state number setting unit 102, the initialization processing unit 103, the latent variable variational probability calculation processing unit 104 (the forward probability calculation processing unit 1041, the normalization constant storage unit 1042, the backward probability calculation processing unit 1043, and the forward/backward probability totaling processing unit 1044), the model optimization processing unit 105, the optimality determination processing unit 106, the optimum model selection processing unit 107, and the model selection result output device 108 are implemented by a CPU of a computer that operates according to a latent variable model estimation program. The CPU reads the latent variable model estimation program from the computer-readable recording medium in which a latent variable model estimation program is recorded, and the CPU has just provide the operation of the above elements according to the latent variable model estimation program.

Alternatively, the latent state number setting unit 102, the initialization processing unit 103, the latent variable variational probability calculation processing unit 104, the model optimization processing unit 105, the optimality determination processing unit 106, the optimum model selection processing unit 107, and the model selection result output device 108 may separately be implemented by hardware. The forward probability calculation processing unit 1041, the normalization constant storage unit 1042, the backward probability calculation processing unit 1043, and the forward/backward probability totaling processing unit 1044 may separately be implemented by hardware in the latent variable variational probability calculation processing unit 104.

Figure 3:
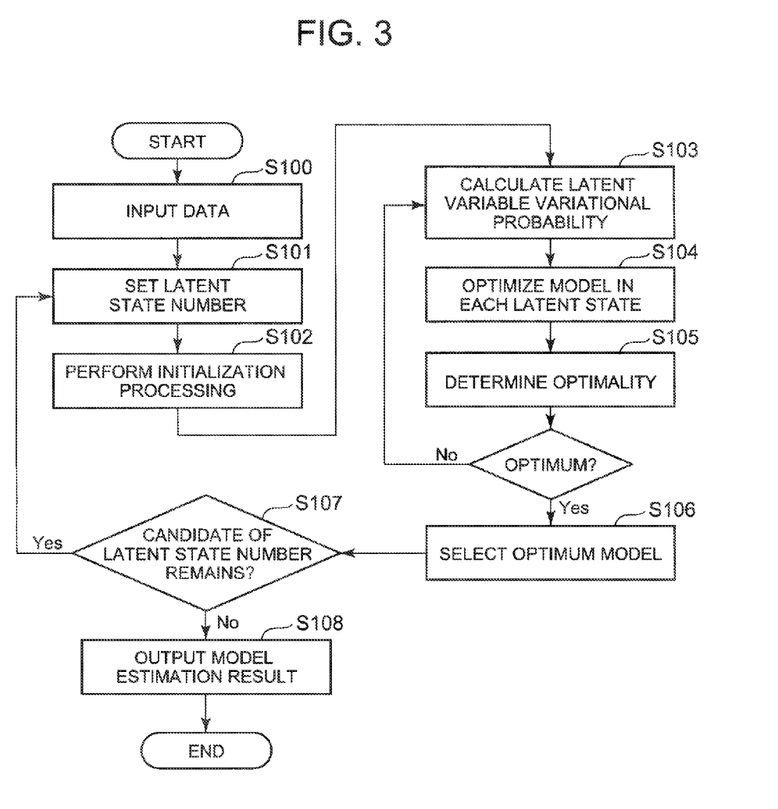
FIG. 3 is a flowchart illustrating an example of a processing procedure of the first exemplary embodiment of the invention.

FIG. 3 is a flowchart illustrating an example of a processing procedure of the first exemplary embodiment of the invention. The input data 111 is input through the data input device 101 (Step S100).

The latent state number setting unit 102 selects and sets the candidate value of the latent state number, to which the optimization is not performed yet, in the input candidate values of the latent state numbers (Step S101).

The initialization processing unit 103 performs the initialization processing of the parameter and the latent variable variational probability to the set latent state number for the purpose of the estimation (Step S102).

The latent variable variational probability calculation processing unit 104 calculates the variational probability of the latent variable (Step S103).

The model optimization processing unit 105 estimates the kind and the parameter of the observation probability in each latent state (Step S104). It can be said that the processing is the optimization of the model in each latent state.

The optimality determination processing unit 106 determines whether the optimization reference A converges (for example, S105). The optimality determination processing unit 106 calculates a difference between the optimization reference A, which is obtained in the current loop processing in Steps S103 to S105, and the optimization reference A, which is obtained in the preceding loop processing in Steps S103 to S105. When an absolute value of the difference is less than or equal to a predetermined threshold, the determination that the optimization reference A converges may be made. When the absolute value of the difference is greater than the threshold, the determination that the optimization reference A does not converge may be made. The difference between the optimization references A is calculated by the absolute value by way of example. Alternatively, a method for determining the convergence by a relative difference may be adopted.

When it is determined that the optimization reference A does not converge in Step S105, the pieces of processing in Steps S103 to S105 are repeated.

When it is determined that the optimization reference A converges in Step S105, the optimum model selection processing unit 107 compares the optimization reference A of the model (the latent state number, the kind of the observation probability, and the parameter), which is optimized in the current loop processing in Steps S103 to S105, to the optimization reference A of the model, which is optimized in the preceding loop processing in Steps S103 to S105, and the optimum model selection processing unit 107 sets the model corresponding to the larger optimization reference A to the optimum model (Step S106).

The latent state number setting unit 102 determines whether the candidate of the latent state number that is not estimated remains (Step S107). When the candidate of the latent state number remains, the pieces of processing in Steps S102 to S107 are repeated. On the other hand, when the candidate of the latent state number does not remain, the model estimation result output device 108 outputs the model estimation result (Step S108), and the processing is ended.

Figure 4:
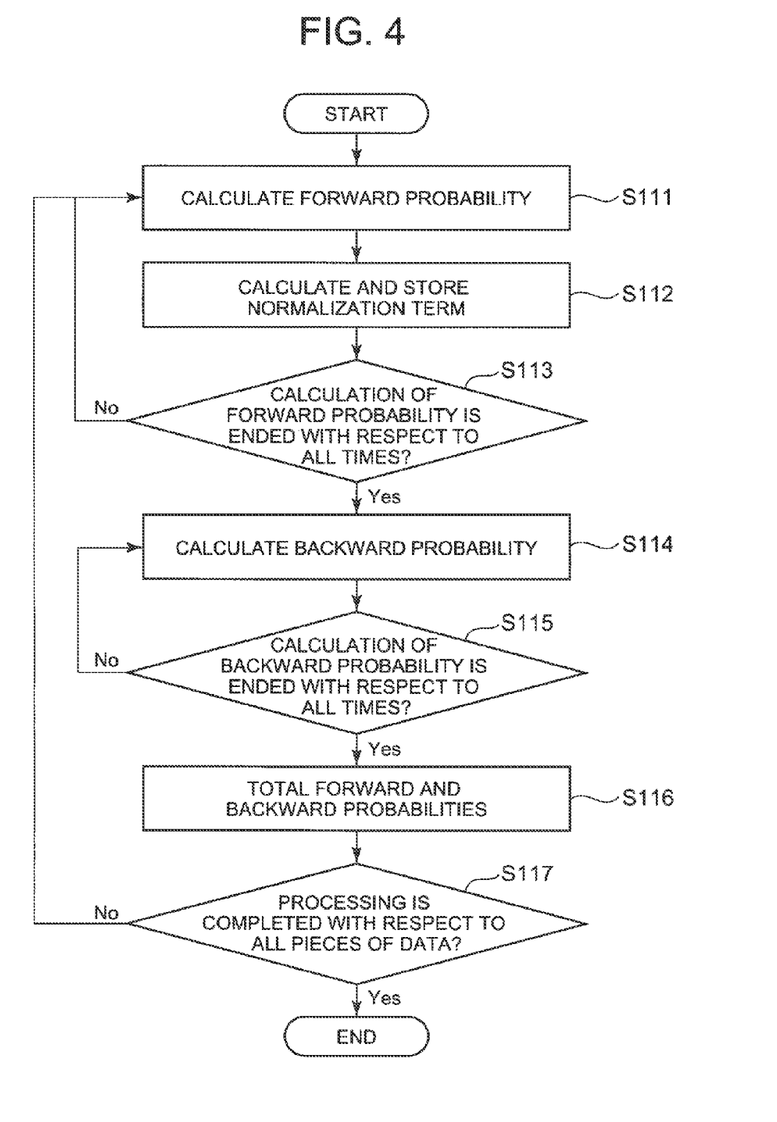
FIG. 4 is a flowchart illustrating an operation of the latent variable variational probability calculation processing unit 104.

FIG. 4 is a flowchart illustrating an operation (in other words, a processing procedure in Step S103) of the latent variable variational probability calculation processing unit 104 of the first exemplary embodiment.

The forward probability calculation processing unit 1041 calculates a forward probability $f^{(i)}nk$ for a tth time of nth data (Step S111). At this point, the forward probability calculation processing unit 1041 also calculates the normalization constant, and stores the normalization constant in the normalization constant storage unit 1042 (Step S112).

Then the forward probability calculation processing unit 1041 checks whether the calculation of the forward probability is completed for all the times t (Step S113). When the calculation of the forward probability is not completed, the pieces of processing in Steps S111 and S112 are repeated. When the calculation of the forward probability is completed, the flow goes to the processing in Step S114.

The backward probability calculation processing unit 1043 calculates a backward probability $b^{t(i)}nk$ for the tth time of the nth data (Step S114). Then the backward probability calculation processing unit 1043 checks whether the calculation of the backward probability is completed for all the times t (Step S115). When the calculation of the backward probability is not completed, the processing in Step S114 is repeated. When the calculation of the backward probability is completed, the flow goes to the processing in Step S116.

The forward/backward probability totaling processing unit 1044 calculates the variational distribution by performing processing of totaling the forward probabilities and the backward probabilities for all the times of the nth data (Step S116).

The forward/backward probability totaling processing unit 1044 checks whether the variational distribution calculation processing is completed for all the pieces of data related to n (Step S117). When the variational distribution calculation processing is not completed, the pieces of processing from Step S111 are repeated. When the variational distribution calculation processing is completed, the processing is ended.

Even if the number of model candidates increases exponentially as the numbers of latent states and kinds of the observation probability increase, the model can be selected at high speed by the operation (Particularly, the operation of the latent variable variational probability calculation processing unit 104) of the invention.

As described above, the technology disclosed in NPTL 4 cannot be applied to the latent variable model having the sequential dependence because the independence is required between the latent variables. On the other hand, in the invention, the latent variable model of the multivariate data having the sequential dependence can be estimated.

Second Exemplary Embodiment

Figure 5:
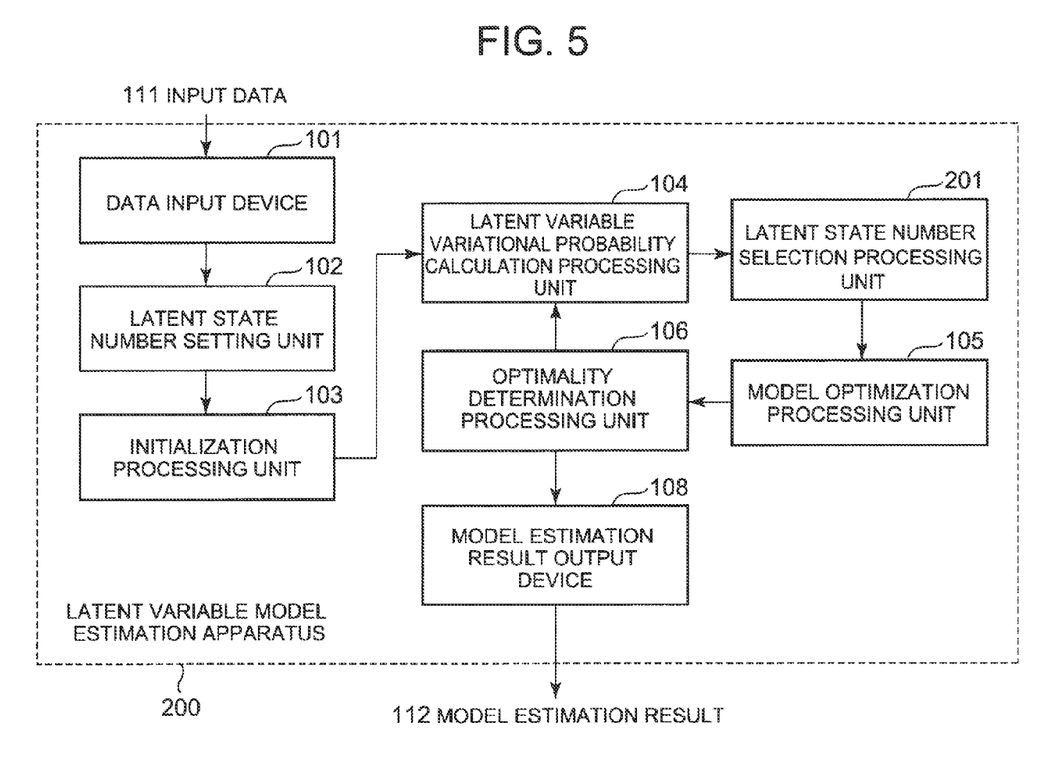
FIG. 5 is a block diagram illustrating a latent variable model estimation apparatus according to a second exemplary embodiment of the invention.

FIG. 5 is a block diagram illustrating a latent variable model estimation apparatus according to a second exemplary embodiment of the invention. Comparing with the latent variable model estimation apparatus 100 (see FIG. 1) of the first exemplary embodiment, the latent variable model estimation apparatus 200 of the second exemplary embodiment includes not the optimum model selection processing unit 107 but a latent state number selection processing unit 201.

The latent variable model estimation apparatus 200 of the second exemplary embodiment is identical to the latent variable model estimation apparatus 100 of the first exemplary embodiment in the data input device 101, the latent state number setting unit 102, the initialization processing unit 103, the latent variable variational probability calculation processing unit 104, the model optimization processing unit 105, the optimality determination processing unit 106 and the model selection result output device 108.

The latent variable model estimation apparatus 100 of the first exemplary embodiment performs the model optimization to the candidate of the latent state number, and selects the model maximizing the optimization reference A. On the other hand, in the latent variable model estimation apparatus 200 of the second exemplary embodiment, the latent state number selection processing unit 201 removes the decreased latent state from the model after the processing of the latent variable variational probability calculation processing unit 104.

Specifically, the latent state number selection processing unit 201 removes the latent state satisfying the state of the following equation (9) with respect to q(z″tk), which is calculated by the latent variable variational probability calculation processing unit 104.

[Formula 9]

$$\sum_{n,t=1}^{N,T_n} q^{(i)}(z_{nk}^t) \le \varepsilon \qquad \text{equation (9)}$$

$\varepsilon$ indicated on the right side of the equation (9) is a threshold that is input at the same time as the input data 111. That is, the latent state number selection processing unit 201 removes the latent state that is less than or equal to the threshold $\varepsilon$.

The latent state is correctly removed using the equation (9) for the following reason. When the forward probability of the equation (7) is observed, the forward probability decreases for the small latent state (that is, the latent state corresponding to the small δtk). In the backward probability, the small latent state does not contribute to the previous state too much. Accordingly, in the variational distribution calculated from the forward probability and the backward probability, the probability of the small latent state decreases gradually through the repetitive optimization (because the latent state tends to decrease easily in the next update step as the latent state decreases in the previous update step). According to the above configuration, unlike the latent variable model estimation apparatus 100, it is not necessary to optimize the plural candidates of the latent state numbers, but advantageously the latent state number, the kind and the parameter of the observation probability, and the variational distribution can simultaneously be estimated to suppress calculation cost.

In the second exemplary embodiment, for example, the latent state number setting unit 102, the initialization processing unit 103, the latent variable variational probability calculation processing unit 104, the latent state number selection processing unit 201, the model optimization processing unit 105, the optimality determination processing unit 106, and the model estimation result output device 108 are implemented by the CPU of the computer that operates according to the latent variable model estimation program. The CPU reads the latent variable model estimation program from the computer-readable recording medium in which a latent variable model estimation program is recorded, and CPU has just provide the operation of the above elements according to the latent variable model estimation program. Each element of the second exemplary embodiment may separately be implemented by hardware.

EXAMPLE 1

An application example of the first exemplary embodiment of the invention will be described by taking a running mode analysis on sensor data of the automobile as an example. In the following example, a one-dimensional example is described for the sake of convenience. However, the invention can also be applied to a multiple dimension.

The time series, such as a "running mode", can be resolved into different properties with respect to multidimensional time-series data acquired from sensors placed in the automobile with the latent variable model estimation apparatus of the first exemplary embodiment. In the case of a fault diagnosis or detection of an abnormal behavior from the sensor data, the behavior of the sensor largely depends on the running mode.

Therefore, it is necessary to resolve into mode and to analyze, and it is important to automatize the resolution and the analysis.

For example, assuming that X is an engine rotation speed and Y is a speed, the hidden Markov model of the multinomial regression output is considered. At this point, the model to be estimated is the latent state number, the regression order (Sk) for the latent state, the regression parameter ($\phi$k), the initial probability ($\alpha$k), the transition probability ($\beta$k), and the variational distribution (q).

K=1 to 10 are input as the candidate values of the latent state numbers to the latent variable model estimation apparatus 100 together with the time-series data of the engine rotation speed and the speed. The latent state number setting unit 102 sequentially sets the latent state number from K=1 to 10. The initialization processing unit 103 randomly sets the regression order and other parameters to the K latent states in the initialization processing. The model is estimated by the latent variable variational probability calculation processing unit 104 to the optimality determination processing unit 106. The different running states, such as the zero-order polynomial of X to Y corresponding to the state (constant acceleration) in which the engine rotation speed is kept constant while the speed increases, the first-order polynomial of X to Y corresponding to the state (during deceleration) in which both the engine rotation speed and the speed decrease, and the second-order polynomial of X to Y corresponding to the state (sudden acceleration) in which the engine rotation speed increases suddenly while the speed increases gradually, are automatically separated as the regression model having different orders and coefficients through the processing. Additionally, because the optimum model determination processing unit 107 automatically selects the best latent state number, for example, the number of drive characteristics (modes) depending on a driver can automatically be detected and separated into the proper number of running modes.

EXAMPLE 2

An application example of the second exemplary embodiment of the invention will be described below by taking a disease pattern analysis from a medical care log (receipt data) as an example. For example, a patient suffering from myocardial infarction frequently develops lifestyle diseases, such as high-blood pressure and diabetes, in advance. The lifestyle disease recurs frequently even if the lifestyle disease is curable once. Measures to reduce a risk of the disease can be studied by analyzing the disease pattern, and the disease pattern analysis can also be used in a lifestyle modification program.

In this example, a multidimensional logical-value vector time series in which plural logical values are arrayed is used as the input data, and each of the logical values indicates whether a person has a high-blood pressure (1 indicates that the person has the high-blood pressure, and 0 indicates that the person does not have the high-blood pressure). A multidimensional Bernoulli-observation hidden Markov model is used as the model to be estimated.

Kmax that is of the latent state number and the selection threshold $\epsilon$ are input together with the input data. The candidate value in the latent state is set to Kmax, and a Bernoulli-distribution parameter is randomly initialized. The model is estimated by the latent variable variational probability calculation processing unit 104 to the optimality determination processing unit 106. Through the processing, the disease pattern can be separated into a pattern in which the high-blood pressure and the diabetes coexist, a pattern (on medication) in which curing and recrudescence of hyperlipidemia are repeated, and a pattern in which the lifestyle diseases are hardly developed, the latent state corresponding to the uncharacteristic pattern decreases and is removed by the latent state number selection device 201, and only the typical pattern can be extracted as the final estimation result.

Figure 6:
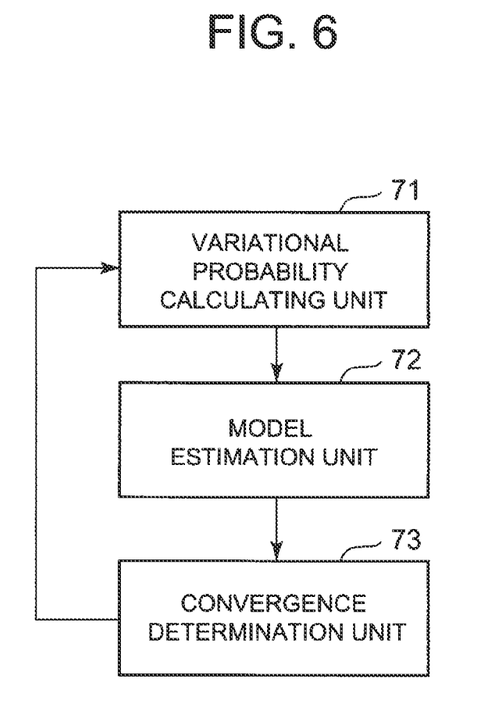
FIG. 6 is a block diagram illustrating an outline of a latent variable model estimation apparatus of the invention.

FIG. 6 is a block diagram illustrating an outline of the latent variable model estimation apparatus of the invention. The latent variable model estimation apparatus of the invention includes a variational probability calculating unit 71, a model estimation unit 72, and a convergence determination unit 73.

The variational probability calculating unit 71 (for example, the latent variable variational probability calculation processing unit 104) calculates the variational probability by maximizing the reference value (for example, the optimization reference A), which is defined as the lower bound of the approximation amount to which the Laplace approximation of the marginalized log likelihood function is performed with respect to the estimator for the complete variable.

The model estimation unit 72 (for example, the model optimization processing unit 105) estimates the optimum latent variable model by estimating the kind and the parameter of the observation probability in each latent state.

The convergence determination unit 73 (for example, the optimization determination processing unit 106) determines whether the reference value, which is used to calculate the variational probability by the variational probability calculating unit 71, converges.

The variational probability calculating unit 71 calculates the variational probability, the model estimation unit 72 estimates the optimum latent variable model, and the convergence determination unit 73 determines whether the reference value converges, namely, the loop processing is repeated. An optimum model selection unit (for example, the optimum model selection processing unit 107) that selects the latent variable model corresponding to the larger reference value as the optimum latent variable model when the reference value converges, the current reference value is compared to the reference value in the preceding loop processing, may be included.

The variational probability calculating unit 71 calculates the variational probability, the model estimation unit 72 estimates the optimum latent variable model, and the convergence determination unit 73 determines whether the reference value converges, namely, the loop processing is repeated. A latent state removing unit (for example, the latent state number selection processing unit 201) that removes the latent state satisfying a predetermined condition according to the calculation result of the variational probability calculating unit may be included.

The model estimation unit 72 may estimate the hidden Markov model as the latent variable model.

The invention is suitably applied to the latent variable model estimation apparatus for the multivariate data having the sequential dependence.

REFERENCE SIGNS LIST

101 data input device
102 latent state number setting unit
103 initialization processing unit
104 latent variable variational probability calculation processing unit
105 model optimization processing unit
106 optimality determination processing unit
107 optimum model selection processing unit
108 model selection result output device
201 latent state number selection processing unit

What is claimed is:

1. A latent variable model estimation apparatus comprising:
   a variational probability calculating unit implemented at least by a hardware including a processor and that calculates a variational probability by maximizing a reference value, the reference value being defined as a lower bound of an approximation amount in which Laplace approximation of a marginalized log likelihood function is performed with respect to an estimator for a complete variable;
   a model estimation unit implemented at least by a hardware including a processor and that estimates an optimum latent variable model by estimating a kind and a parameter of an observation probability in each latent state;
   a convergence determination unit implemented at least by a hardware including a processor and that determines whether the reference value, which is used to calculate the variational probability by the variational probability calculating unit, converges; and
   an optimum model selection unit implemented at least by a hardware including a processor and that selects a latent variable model as the optimum latent variable model, the latent variable model corresponding to the larger reference value when the reference value converges in repeating loop processing in which the variational probability calculating unit calculates the variational probability, the model estimation unit estimates the optimum latent variable model, and the convergence determination unit determines whether the reference value converges, and when the reference value in the current loop processing is compared to the reference value in the preceding loop processing.

2. A latent variable model estimation apparatus comprising:
   a variational probability calculating unit implemented at least by a hardware including a processor and that calculates a variational probability by maximizing a reference value, the reference value being defined as a lower bound of an approximation amount in which Laplace approximation of a marginalized log likelihood function is performed with respect to an estimator for a complete variable;
   a model estimation unit implemented at least by a hardware including a processor and that estimates an optimum latent variable model by estimating a kind and a parameter of an observation probability in each latent state;
   a convergence determination unit implemented at least by a hardware including a processor and that determines whether the reference value, which is used to calculate the variational probability by the variational probability calculating unit, converges; and
   a latent state removing unit implemented at least by a hardware including a processor and that removes the latent state satisfying a predetermined condition according to a calculation result of the variational probability calculating unit in repeating loop processing in which the variational probability calculating unit calculates the variational probability, the model estimation unit estimates the optimum latent variable model, and the convergence determination unit determines whether the reference value converges.

3. The latent variable model estimation apparatus according to claim 1, wherein the model estimation unit estimates a hidden Markov model as a latent variable model.

4. A latent variable model estimation method comprising:
   calculating a variational probability by maximizing a reference value, the reference value being defined as a lower bound of an approximation amount in which Laplace approximation of a marginalized log likelihood function is performed with respect to an estimator for a complete variable;
   estimating an optimum latent variable model by estimating a kind and a parameter of an observation probability in each latent state;
   determining the reference value, which is used to calculate the variational probability, converges; and
   selecting a latent variable model as the optimum latent variable model, the latent variable model corresponding to the larger reference value when the reference value converges in repeating loop processing in which the variational probability is calculated, the optimum latent variable model is estimated, and whether the reference value converges is determined, and when the reference value in the current loop processing is compared to the reference value in the preceding loop processing.

5. A latent variable model estimation method comprising:
   calculating a variational probability by maximizing a reference value, the reference value being defined as a lower bound of an approximation amount in which Laplace approximation of a marginalized log likelihood function is performed with respect to an estimator for a complete variable:
   estimating an optimum latent variable model by estimating a kind and a parameter of an observation probability in each latent state;
   determining whether the reference value, which is used to calculate the variational probability, converges; and
   removing the latent state satisfying a predetermined condition according to a calculation result of the variational probability in repeating loop processing in which the variational probability is calculated, the optimum latent variable model is estimated, and whether the reference value converges is determined.

6. The latent variable model estimation method according to claim 4, wherein a hidden Markov model is estimated as a latent variable model.

7. A non-transitory computer-readable recording medium in which a latent variable model estimation program is recorded, the latent variable model estimation program causing a computer to execute:
   a variational probability calculation processing of calculating a variational probability by maximizing a reference value, the reference value being defined as a lower bound of an approximation amount in which Laplace approximation of a marginalized log likelihood function is performed with respect to an estimator for a complete variable;
   a model estimation processing of estimating an optimum latent variable model by estimating a kind and a parameter of an observation probability in each latent state;
   a convergence determination processing of determining whether reference value, which is used to calculate the variational probability in the variational probability calculation processing, converges; and
   an optimum model selection processing of selecting a latent variable model as the optimum latent variable model, the latent variable model corresponding to the larger reference value when the reference value converges in repeating loop processing of the variational probability calculation processing, the model estimation processing, and the convergence determination processing, and when the reference value in the current loop processing is compared to the reference value in the preceding loop processing.

8. A non-transitory computer-readable recording medium in which a latent variable model estimation program is recorded, the latent variable model estimation program causing a computer to execute:

a variational probability calculation processing of calculating a variational probability by maximizing a reference value, the reference value being defined as a lower bound of an approximation amount in which Laplace approximation of a marginalized log likelihood function is performed with respect to an estimator for a complete variable;

a model estimation processing of estimating an optimum latent variable model by estimating a kind and a parameter of an observation probability in each latent state;

a convergence determination processing of determining whether the reference value, which is used to calculate the variational probability in the variational probability calculation processing, converges; and a latent state removing processing of removing the latent state satisfying a predetermined condition according to a calculation result of the variational probability calculation processing in repeating loop processing of the variational probability calculation processing, the model estimation processing, and the convergence determination processing.

9. The non-transitory computer-readable recording medium in which a latent variable model estimation program is recorded according to claim 7, wherein the latent variable model estimation program causes the computer to estimate a hidden Markov model as the latent variable model in the model estimation processing.

* * * * *